Feb. 23, 1937.  J. V. SCHAFER  2,071,474

FISHING REEL

Filed Feb. 4, 1935  4 Sheets-Sheet 1

Inventor
John V. Schafer
By Freeman, Sweet, Albrecht & Werdman
Attorneys

Feb. 23, 1937.  J. V. SCHAFER  2,071,474
FISHING REEL
Filed Feb. 4, 1935    4 Sheets-Sheet 2

Inventor:
John V. Schafer
By Freeman, Sweet, Albrecht & Weidman
Attorneys

Feb. 23, 1937. J. V. SCHAFER 2,071,474
FISHING REEL
Filed Feb. 4, 1935 4 Sheets-Sheet 3

Inventor
John V. Schafer

Feb. 23, 1937.   J. V. SCHAFER   2,071,474
FISHING REEL
Filed Feb. 4, 1935   4 Sheets-Sheet 4

Inventor;
John V. Schafer
By Freeman, Sweet, Albrecht & Wadman
Attorneys

Patented Feb. 23, 1937

2,071,474

UNITED STATES PATENT OFFICE 2,071,474

FISHING REEL

John V. Schafer, Bronson, Mich., assignor to Bronson Reel Company, Bronson, Mich., a corporation of Michigan Application February 4, 1935, Serial No. 4,730

16 Claims. (Cl. 242—84.1)

My invention relates to fishing reels, and includes among its objects and advantages improvements in the drive mechanism of such reels having particular relation to quiet running, ease in replacing worn or defective parts, a gear assembly that will permit the use of a different type of metal for the pinions that are subjected to the heaviest loads, and a frame construction adapted to secure alignment as precise as with a unitary frame, but capable of convenient separation into independent sub-units for inspection and repair or replacements of parts.

Since a fishing reel is not classified as an instrument, the failure of which could be expected to involve danger to life or limb, there is no statutory requirement with respect to the margin of safety in designing such equipment, and it is generally customary in the industry to load the metal up to stresses much nearer the elastic limit of the material than would be safe practice in such a mechanism as an automobile transmission or than would be permitted in an airplane. One of the common points of breakage in such reels is the pinion on the spool shaft, and when it breaks, the break usually occurs when playing a heavy fish.

Figure 1:
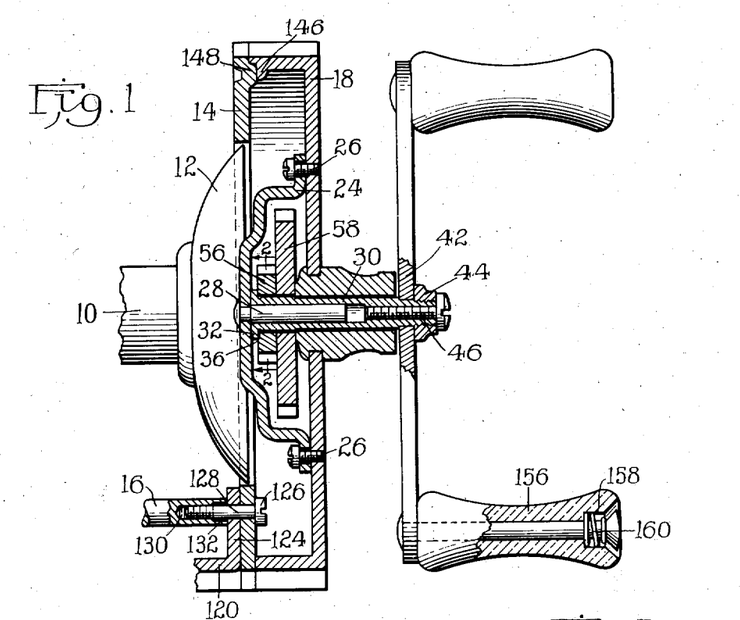
Figure 1 is a sectional view through a reel according to the invention on line 1—1 of Figure 17.

In the embodiment of the invention selected for illustration in Figure 1, I have illustrated the usual spool shaft 10 carrying the flange 12, and the end plate 14 supported by a series of pillars, one of which is indicated at 16.

Gearing

Figure 2:
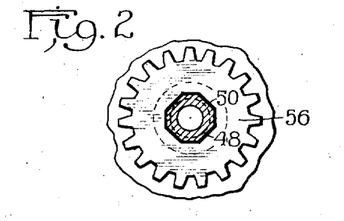
Figure 2 is a detail section on line 2—2 of Figure 1.

The bridge 24 is rigidly assembled on the head cap 18, as by fastening screws 26, and supports a rigid stud 28 forming a pintle for the tubular drive shaft 30. The drive shaft 30 comprises the cylindrical end flange 32 and the polygonal gear carrying portion 34 separated from the flange 32 by a narrow neck 36. Beyond the gear-carrying portion 34 the shaft is continued as a plain cylinder at 38 having flattened portions at 40 at its outer end shaped to fit the opening in the drive crank 42. The drive crank 42 is fastened in place by the nut 44. The retaining screw 46 has threaded engagement with the central bore of the shaft 30 of sufficient length so that the nut 44 can be completely screwed out of engagement with the shaft 30 before the screw 46 is unscrewed far enough to become detached, and the number of threads per inch on the nut and the screw is the same. The polygonal gear holding portion 34 illustrated in Figure 2 is almost, but not quite, octagonal, having the cross section clearly indicated in Figure 2 with sides at 48 forming portions of a square, and slightly smaller sides at 50 formed by truncating the corners of the square. In cases where design considerations make it necessary to mount a pinion of minimum diameter on such a shaft, the substantially octagonal section illustrated leaves more metal in the ring of solid material inside the bottoms of the pinion teeth than other sections previously employed.

Figure 4:
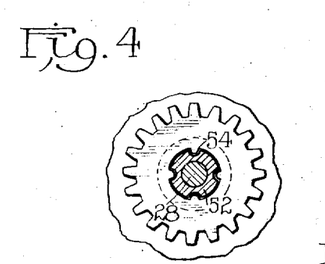
Figure 4 is a section as on line 2—2 of Figure 1 indicating an alternative shaft and gear formation.
Figure 5:
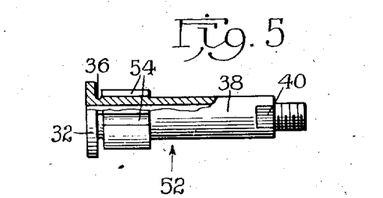
Figure 5 is a side elevation of the shaft of Figure 4.

Referring to Figures 4 and 5, the shaft 52 is identical with shaft 30, so far as the cylindrical portion 38 and the right end of the shaft is concerned. The butt includes the same flange 32 and the same neck 36, but the gear holding portion is a cylinder with four broached grooves 54.

I have illustrated a small gear 56 on the shaft 30 for driving the level winding mechanism, and a large gear 58 for driving the spool shaft. Both gears are simply slipped in place over the gear-holding portion 34 and are preferably made of stamped sheet metal. The openings in the gears, as indicated in Figure 2, are larger than the gear holding portion 34, with a clearance all around of the order of magnitude of from .001 to .003 of an inch for the total transverse dimension of the opening. Thus with .003 inch difference, the gear 56 of Figure 2 can float with a space of .0015 inch separating each of its faces from the opposing faces of the polygonal gear-holding portion. This allows each gear to tip or wobble just a few degrees with respect to the alignment of the plane of the gear with a plane normal to the drive shaft axis. This limited freedom permits the gears to align their teeth perfectly with the other gears or pinions with which they mesh, especially when the other gears or pinions with which they mesh are similarly mounted. The result is a transmission which can be manufactured in quantity production within the tolerances necessary for quantity production, that will still permit assembly of thousands of gears and shafts without any attempt to fit an individual gear to an individual shaft, but the assembled transmission will run as quietly and as free from friction and binding, as previous transmissions in which the time and effort of an expert mechanic has been employed to secure individual fitting of the parts with precision far beyond that possible in mass production.

This clearance also makes it possible to use ordinary sheet metal stampings for the gears without special broaching of the center holes therein. It is well known that a geometrically true cylindrical hole can not be punched in sheet metal, but that the sides of such a hole have a slight taper making the hole larger at one end than at the other. Such taper can be removed by a second reaming or broaching operation, but, in metal of the thickness employed for such gears as those disclosed herein, the taper is only a minor fraction of the clearance specified and therefore could be allowed to remain. However, when the teeth are milled, the insertion of a snugly fitting arbor will lap the taper to a still more negligible amount.

The use of sheet metal gears has another very outstanding advantage in that the grain of the metal in sheet metal is parallel to the surface of the metal, whereas in rolled shafting the grain is parallel to the axis. A finished pinion such as 62 of rolled shafting has a materially weaker hub than the same identical shape formed from sheet metal on this account. However, the construction shown provides polygonal interengagement between the shaft and pinion throughout the full length of their contact with each other, which strengthens the connection independent of the material used.

Figure 6:
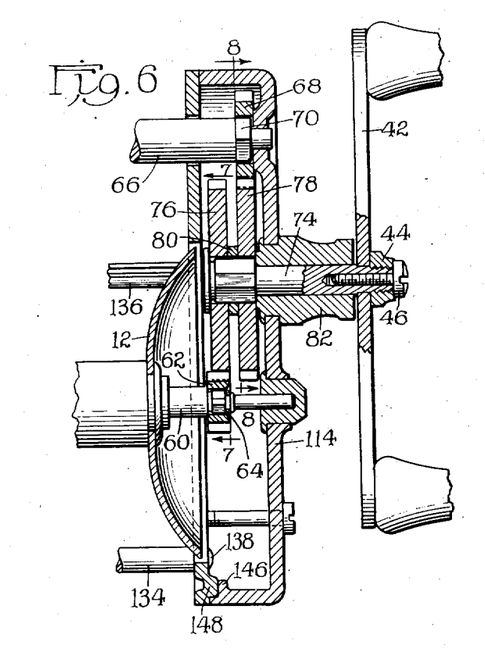
Figure 6 is a section of a complete drive according to the invention on line 6—6 of Figure 17.
Figure 7:
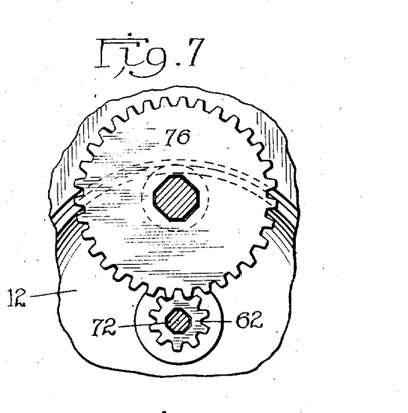
Figure 7 is a fragmentary view on line 7—7 of Figure 6.
Figure 8:
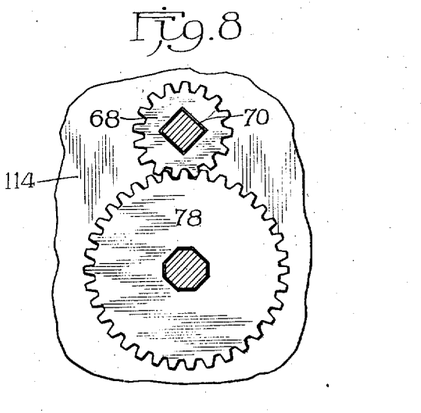
Figure 8 is a fragmentary view on line 8—8 of Figure 6.

Referring now to Figure 6, I have illustrated the application of the principles of the invention to the type of construction customarily referred to in this art as a three gear drive. The spool shaft 60 carries the sheet metal pinion 62 detachably locked in place by a wire split ring 64, and the level winding shaft 66 carries a drive pinion 68. Both pinions 62 and 68 are mounted with clearance on their shafts, as in the case of gear 56 of Figure 2. Because the pinion 68 is of ample size to permit it, the pinion-carrying portion 70 of the level winding shaft is left square as clearly indicated in Figure 8, but the pinion-carrying portion 72 of the spool shaft is octagonal to leave room for more metal in the hub of the pinion 62.

Figure 3:
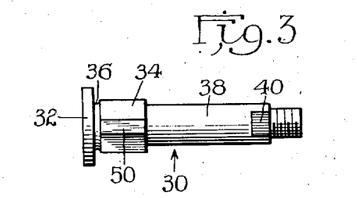
Figure 3 is an elevation of the shaft of Figure 1.

Transmissions of this type have been called three gear transmissions because in the past a single large gear on the drive shaft 74 was employed to mesh with both pinions 62 and 68. To make the free running characteristics of gearing according to the invention more completely effective, I employ identical gears 76 and 78 spaced axially by an intervening washer 80. Gear 76 meshes with pinion 62, and gear 78 meshes with pinion 68, but because the gears 76 and 78 are separate pieces of metal and able to have a limited movement with respect to each other, each pair of intermeshing gear elements can turn in freely floating condition and no minor imperfections in the teeth can cause any binding action in any part of the transmission. Shaft 74 has been illustrated of the solid type having an elongated bearing in the sleeve 82. In external configuration it is identical with shaft 38 of Figure 3.

Figure 9:
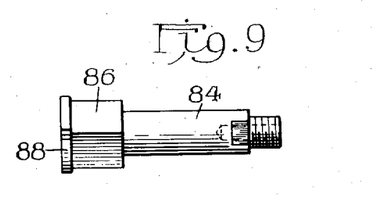
Figure 9 is a side elevation of an alternative shaft construction.
Figure 10:
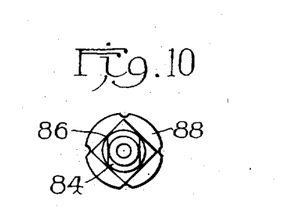
Figure 10 is an end view of the shaft of Figure 9.

In Figures 9 and 10 I have illustrated an alternative method of forming the butt flange for such a drive shaft. The shaft 84 has been formed from a piece of material originally round and of a diameter equal to that of a circle in which the polygonal gear holding portion 86 can be inscribed. Then the broach that shaves off sectors to form the polygonal portion is permitted to swedge part of the material removed by it into the ears 88, and these ears form the gear abutment in the finished shaft.

Figures 11, 12:
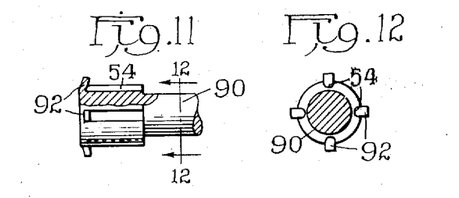
Figure 11 is an elevation of the butt of another alternative shaft construction.
Figure 12 is a section on line 12—12 of Figure 11.

Similarly, in Figures 11 and 12 I have illustrated a shaft 90 having a gear carrying portion identical with that of shaft 52 of Figure 5 except that the gear abutment comprises four ears 92 swedged out of the metal by the broaching tool used to form the grooves 54.

The traditional four gear reel transmission makes it possible to fix the diameters of the driving pinions on the spool shaft and the level wind shaft independently. In making up such a transmission according to the invention, as illustrated in Figures 13 to 16, the spool shaft 94 may carry a pinion 96 relatively somewhat larger than the pinion 62 and having a correspondingly stronger hub similarly locked in place by the ring 98. In the construction illustrated it is still possible to design the level wind drive pinion 100 large enough to permit the shaft portion 102 carrying the pinion to be left square and still have ample strength in the pinion hub. Because the pinion 100 carries relatively extremely light loads, I prefer to form a rounded end on the level wind shaft at 104 and peen the edges of the rounded end over a little to hold the pinion 100 in place, but not to an extent that would eliminate rotary play.

The shaft 106 may be hollow as in Figure 1 or solid as in Figure 6. I have illustrated a solid shaft. The gear 108 for driving the spool pinion 96 and the gear 110 for driving the level wind pinion 100 are of different diameters. They both float on their drive shaft as previously explained. Between them I mount a washer 112 which projects out to the base of the teeth of the gear 108.

In quantity production it is sufficient to let the peened end 104 of the level wind shaft act to restrain the level wind shaft against longitudinal movement. By making the washer 112 of the size indicated, its smooth, slippery face near the outer edge forms a stop or abutment for the end 104 of the level wind shaft, and eliminates any necessity for polishing or finishing the surface of the gear 108, especially near the base of the teeth therein.

*Framework*

The looseness of the gearing already described contributes to the availability and success of the novel frame construction disclosed. It will be noted that in each instance the drive gears and the adjacent end of the spool derive their support from the cap, but that in Figure 13 the level wind shaft bearing is in the head plate, whereas in Figure 6 it is in the cap. Accordingly, in the reel of Figure 6 it is only necessary to have a degree of alignment between the cap 114 and the remote end plate, or tail plate (not shown), sufficient to prevent binding in the bearings. But in the reel of Figure 13 the meshing of the pinion 100 and the gear 110 depend on the registry of the cap 116 with the end plate 118.

This is accomplished in the construction illustrated without running the pillars through the end plate 118 and to or through the cap 116, with abutment shoulders for both the plate and cap. The mounting plate 120 of Figure 1 carries the usual elongated center portion illustrated at 122 in Figure 17, shaped to receive the rod. Its wings 124 are turned up parallel to the adjacent end plates, and each wing has three holes for fastening it to the end plate. At each end hole I provide a pillar 16 which forms a direct compression strut and determines the spacing of the end plates more precisely than the more flexible wing corners could do.

Figure 19:
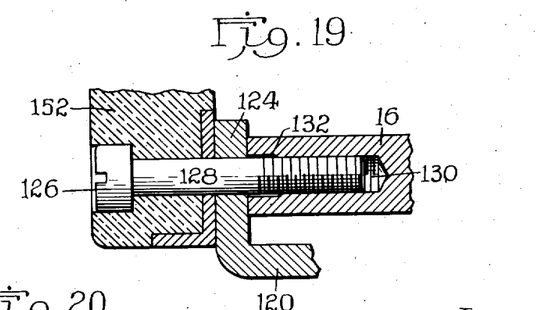
Figure 19 is an enlarged section as one line 19—19 of Figure 17, of the reel of Figure 18.

Referring to Figures 1 and 19, cap screws 126 pass through accurately reamed holes in the plate 14 and wings 124, with their cylindrical shanks 128 in snug fitting engagement with the holes. The threaded end of the screw engages the tapped hole 130 in the pillar 16, and draws the wing 124 and plate 14 into firm abutment with the pillar end. To facilitate using a shank that will provide a smooth bearing for the wing 124, the adjacent end of the pillar is drilled out as at 132 for clearance.

Figure 13:
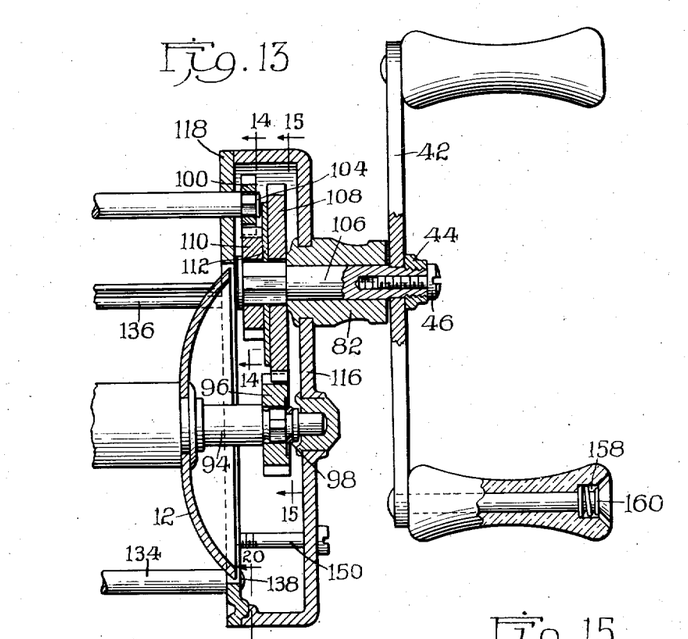
Figure 13 is a complete section as in Figure 6 of a four gear transmission.
Figure 14:
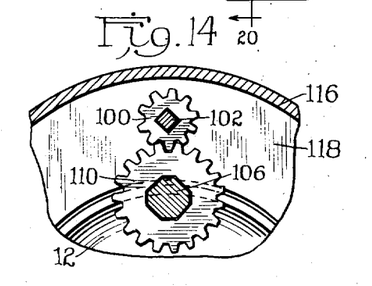
Figure 14 is a fragmentary section on line 14—14 of Figure 13.
Figure 15:
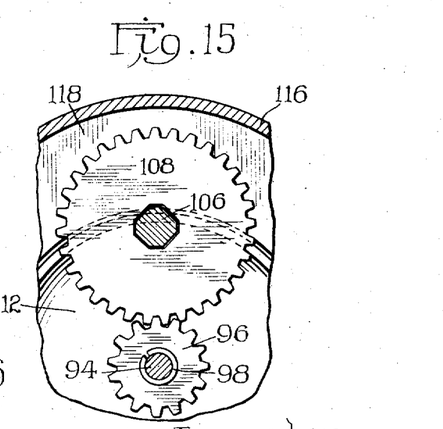
Figure 15 is a fragmentary section on line 15—15 of Figure 13.
Figure 16:
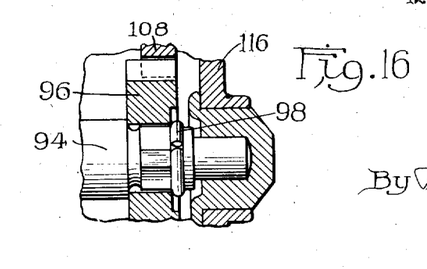
Figure 16 is an enlargement of the end of the spool shaft and immediately associated parts in Figure 13.
Figure 17:
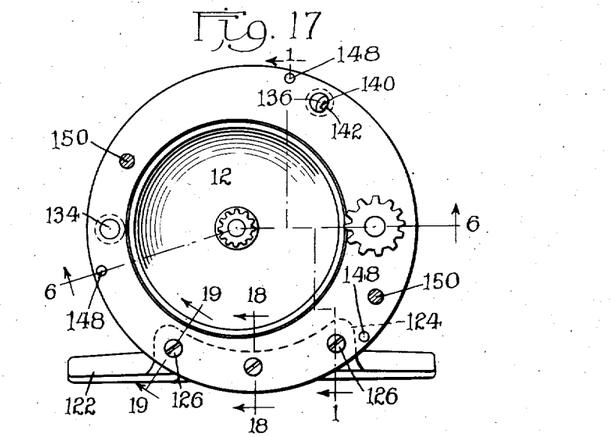
Figure 17 is an end elevation of the reel of Figure 13 with the cap removed.

Referring now to Figures 6, 13, and 17, I have illustrated two more pillars, 134 and 136. Pillar 134 is longer than pillars 16, and provides a portion of full diameter exceeding the length of pillars 16 by the thickness of the metal in the two wings 124. Beyond the full diameter portion, extensions of reduced diameter pass through reamed holes in the end plates and are riveted over as shown at 138 in Figures 6 and 13.

Pillar 136 is identical with 134 except for the milled slot at 140 for receiving the end of a line-guiding loop. To orient the slot to receive the loop with a minimum of difficulty in assembly, I continue the slot at the head and out through the reduced end portion. I then form the die for blanking the head end plate to punch the hole for the pillar with one flat side, indicated at 142 in Figure 17. Such parts can be assembled by an unskilled person, operating the riveter, as the pillar 136 will only enter the hole with the slot 140 facing in the right direction.

Such assembly unites the end plates and pillars and mounting plate into a structure that can be assembled in commercial quantities with greater precision than would be possible if the pillars were continued on through the cap, and the strains of assembling the cap were imposed on the pillar structure.

Figure 20:
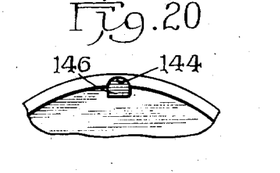
Figure 20 is a detail of part of the end cap as on line 20—20 of Figure 13.

Referring to Figure 20, the edges of the caps 18, 114, and 116 are provided with a plurality of irregularities formed by dies stamping so that a high degree of uniformity is obtainable in the product. I have illustrated notches broached out to define small cavities 144, each surmounted by a small lug 146 formed from the metal expelled from the cavity by the broach. Corresponding tits 148 are raised in the surface of the head plate. Since all these parts are die-formed, alignment between the cap and the main frame can be secured with an accuracy well within the variations that are made permissible because of the clearances used in mounting the gears on their shafts. Nothing further is needed except to restrain the cap from axial removal, and a pair of simple cap screws 150 threaded into the end plate is ample for the purpose.

Figure 18:
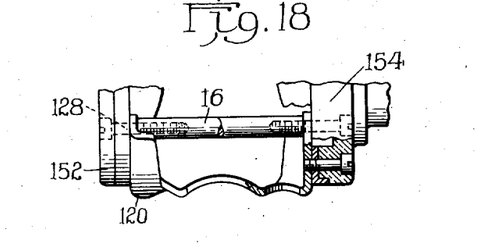
Figure 18 is a partial section as on line 18—18 of Figure 17, of a reel with composition end plates.

The complete pillar arrangement disclosed is applicable to reels employing no cap, as in Figures 18 and 19 where the bakelite end plates 152 and 154 are shown connected by the pillars 16 and the mounting plate 120, although the special advantages of such a construction for improving the assembly and quietness of a reel using a cap, are not so much in evidence.

The handles 156 for turning the crank 42 are counterbored at 158, and a very light spring 160, housed in the counterbore, eliminates rattling.

Without further elaboration, the foregoing will so fully explain my invention that others may, by applying knowledge current at the time of application, readily adapt the same for use under various conditions of service.

I claim:

1. In a fishing reel, in combination: a drive shaft; a spool shaft and a level wind shaft on spaced parallel axes; gearing on said shafts for driving said spool shaft and level wind shaft from said drive shaft; each shaft having a non-circular portion engaging its gear; each gear fitting the non-circular portion with sufficient looseness to permit variations in alignment not less than those caused by variation in the intermeshing engagement of the gear teeth.

2. In a fishing reel, in combination: a drive shaft and a level wind shaft on spaced parallel axes; gearing on said shafts for driving said level wind shaft from said drive shaft; each shaft having a non-circular portion engaging its gear; each gear fitting the non-circular portion with sufficient looseness to permit variations in alignment not less than those caused by variation in the intermeshing engagement of the gear teeth.

3. In a fishing reel, in combination: a shaft having a broached non-circular portion; and a sheet metal gear having a punched non-circular hole shaped to receive said non-circular shaft portion; the hole in said gear being larger than said broached portion to clear the same with a clearance of the order of magnitude of .001 inch all around.

4. In a fishing reel, a shaft having, in combination: a broached non-circular portion; a butt flange at one end; and a short necked portion between said flange and said broached portion to secure chip separation and chip clearance in the broaching operation.

5. In a fishing reel, a shaft having, in combination: a broached non-circular portion; and an end flange adjacent said broached portion; said end flange being formed out of the material removed from the broached portion by broaching.

6. In a fishing reel, in combination: a frame; a spool shaft journaled in said frame; and a drive pinion on said shaft; the shaft portion carrying said pinion having a uniform polygonal cross section throughout the extent of its contact with the pinion; said pinion being a loose fit on the polygonal spool-shaft portion.

7. In a fishing reel, in combination: spaced head end and tail end plates; a cap on said head plate; connections bracing said plates including a plurality of pillars extending between said end plates, all said pillars ending at said head end plate; said cap having an inturned edge, said inturned edge and the plate portion abutting it having spaced registering irregularities of contour completely determining the positioning of said cap except axially; axial tension members extending from cap to plate to clamp said cap in place; a spool shaft; a level wind shaft; pinions on the head ends of both shafts; and drive gears carried by said cap for driving both pinions.

8. In a fishing reel, in combination: spaced head end and tail end plates; a cap on said head plate; a mounting plate having a central rod-engaging wing portion and portions turned parallel to said end plates and bearing against the inner surfaces thereof; a pillar extending between said wing portions; and fastening members having heads engaging the outer surfaces of said plates, cylindrical portions passing through said plates and wing portions, and threaded portions entering the ends of said pillar, for fastening said pillar in place.

9. In a fishing reel, in combination: spaced head end and tail end plates and connections bracing said plates, including a pillar having a longitudinal slot to guide a level winding loop, said pillar having reduced ends passing through said end plates, at least one end of said pillar having its reduced end slotted as a continuation of the main slot, the plate receiving said slotted end having a hole with a flat side to receive said slotted end, whereby assembly aligns said slot to receive the level winding loop.

10. In a fishing reel, in combination: spaced head end and tail end plates; and connections bracing said plates, including a mounting plate having a central rod-engaging portion and end wings turned parallel to said end plates and bearing against the inner surfaces thereof; each wing being fastened to the adjacent plate at both ends; pillars extending between the ends of said wings; and fastening members having heads engaging the outer surfaces of said plates, and cylindrical portions passing through said plates and wings, and threaded portions entering the ends of said wing-bracing pillars, for fastening said pillars in place.

11. In a fishing reel, in combination: spaced head end and tail end plates; a cap on said head plate; connections bracing said plates and cap including a mounting plate having a central rod-engaging portion and arcuate end wings turned parallel to said end plates and bearing against the inner surfaces thereof; each wing being fastened to the adjacent plate at both ends and at an intermediate point; a plurality of pillars extending between said end plates; two of said pillars extending between the ends of said wings; another of said pillars having a longitudinal slot to guide a level winding loop; said slotted pillar having reduced ends passing through said end plates; at least one end of said slotted pillar having its reduced end slotted as a continuation of the main slot; the plate receiving said slotted end having a hole with a flat side to receive said slotted end, whereby assembly aligns said slot to receive the level winding loop; all said pillars ending at said head end plate; said cap having an inturned edge; said inturned edge and the plate portion abutting it having die-formed spaced registering irregularities of contour completely determining the positioning of said cap except axially; fastening members having heads engaging the outer surfaces of said plates and having cylindrical portions passing through said plates and wings, and threaded portions entering the ends of said wing-bracing pillars, for fastening said pillars in place; a spool shaft journaled in said tail plate and cap; a level wind shaft journaled in said end plates; pinions on the head ends of both shafts; and drive gears carried by said cap for driving both pinions.

12. In a fishing reel, in combination: spaced head end and tail end plates; a cap on said head plate; and connections bracing said plates and cap including a mounting plate having a central rod-engaging portion and arcuate end wings turned parallel to said end plates and bearing against the inner surfaces thereof; each wing being fastened to the adjacent plate at both ends and at an intermediate point; a plurality of pillars extending between said end plates; two of said pillars extending between the ends of said wings; another of said pillars having a longitudinal slot to guide a level winding loop; said slotted pillar having reduced ends passing through said end plates; at least one end of said slotted pillar having its reduced end slotted as a continuation of the main slot; the plate receiving said slotted end having a hole with a flat side to receive said slotted end, whereby assembly aligns said slot to receive the level winding loop; all said pillars ending at said head end plate; said cap having an inturned edge; said inturned edge and the plate portion abutting it having three uniformly spaced registering irregularities of contour completely determining the positioning of said cap except axially; and axial tension members extending from cap to plate to clamp said cap in place.

13. In a fishing reel, in combination: head and tail end plates, pillars, and a mounting plate united into a rigid unitary frame; a spool shaft; a level wind shaft; said spool and level wind shafts having journals in said tail end plate and extending through said head end plate; a cap laid over said head end plate; a drive shaft journaled in said cap; said cap having a journal for said spool shaft; the cap end of said level wind shaft being journaled in said head end plate; said cap and head end plate having registering die-formed irregularities of contour for complete alignment, except for axial separation; direct tension connections preventing axial separation of said head end plate and cap; a gear transmission connecting said drive shaft and level wind shaft; a gear transmission connecting said drive shaft and spool shaft; all the gears in both transmissions being assembled loosely on their shafts with looseness in the plane of the gear of the order of magnitude of 0.001 inch.

14. In a fishing reel, in combination: head and tail end plates, pillars, and a mounting plate united into a rigid unitary frame; a spool shaft; a level wind shaft; said spool and level wind shafts having journals in said tail end plate and extending through said head end plate; a cap laid over said head end plate; a drive shaft journaled in said cap; said cap having a journal for said spool shaft and a journal for said level wind shaft; said cap and head end plate having registering die-formed irregularities of contour for complete alignment, except for axial separation; direct tension connections preventing axial separation of said head end plate and cap; a gear transmission connecting said drive shaft and level wind shaft; a gear transmission connecting said drive shaft and spool shaft; all the gears in both transmissions being assembled loosely on their shafts with looseness in the plane of the gear of the order of magnitude of 0.001 inch.

15. In a fishing reel, in combination: a spool shaft; a level wind shaft; a drive shaft; a gear transmission connecting said drive shaft and level wind shaft; a gear transmission connecting said drive shaft and spool shaft; all the gears in both transmissions being assembled loosely on their shafts with looseness in the plane of the gear of the order of magnitude of 0.001 inch.

16. In a fishing reel, in combination: spaced head end and tail end plates, and connections bracing said plates, including: a mounting plate having a central rod-engaging portion and end portions abutting said end plates; pillars extending across between said end portions to brace them; and fastenings at the ends of said pillars, each fastening having threaded engagement with the adjacent pillar end and including abutment means for clamping the adjacent end plate, and the adjacent end portion of said mounting plate, to the adjacent threaded pillar end, to hold all three rigidly in assembled relation.

JOHN V. SCHAFER.

CERTIFICATE OF CORRECTION.

Patent No. 2,071,474.                                February 23, 1937.

JOHN V. SCHAFER.

It is hereby certified that error appears in the printed specification of the above numbered patent requiring correction as follows: Page 1, first column, line 54, for the word "one" read on; page 4, first column, line 27, claim 8, strike out "wing" and insert the same after "and", same line and claim; and that the said Letters Patent should be read with these corrections therein that the same may conform to the record of the case in the Patent Office.

Signed and sealed this 6th day of April, A. D. 1937.

(Seal)                                                   Henry Van Arsdale
                                                    Acting Commissioner of Patents.

in said cap; said cap having a journal for said spool shaft and a journal for said level wind shaft; said cap and head end plate having registering die-formed irregularities of contour for complete alignment, except for axial separation; direct tension connections preventing axial separation of said head end plate and cap; a gear transmission connecting said drive shaft and level wind shaft; a gear transmission connecting said drive shaft and spool shaft; all the gears in both transmissions being assembled loosely on their shafts with looseness in the plane of the gear of the order of magnitude of 0.001 inch.

15. In a fishing reel, in combination: a spool shaft; a level wind shaft; a drive shaft; a gear transmission connecting said drive shaft and level wind shaft; a gear transmission connecting said drive shaft and spool shaft; all the gears in both transmissions being assembled loosely on their shafts with looseness in the plane of the gear of the order of magnitude of 0.001 inch.

16. In a fishing reel, in combination: spaced head end and tail end plates, and connections bracing said plates, including: a mounting plate having a central rod-engaging portion and end portions abutting said end plates; pillars extending across between said end portions to brace them; and fastenings at the ends of said pillars, each fastening having threaded engagement with the adjacent pillar end and including abutment means for clamping the adjacent end plate, and the adjacent end portion of said mounting plate, to the adjacent threaded pillar end, to hold all three rigidly in assembled relation.

JOHN V. SCHAFER.

CERTIFICATE OF CORRECTION.

Patent No. 2,071,474.         February 23, 1937.

JOHN V. SCHAFER.

It is hereby certified that error appears in the printed specification of the above numbered patent requiring correction as follows: Page 1, first column, line 54, for the word "one" read on; page 4, first column, line 27, claim 8, strike out "wing" and insert the same after "and", same line and claim; and that the said Letters Patent should be read with these corrections therein that the same may conform to the record of the case in the Patent Office.

Signed and sealed this 6th day of April, A. D. 1937.

(Seal)

Henry Van Arsdale
Acting Commissioner of Patents.

CERTIFICATE OF CORRECTION.

Patent No. 2,071,474. February 23, 1937.

JOHN V. SCHAFER.

It is hereby certified that error appears in the printed specification of the above numbered patent requiring correction as follows: Page 1, first column, line 54, for the word "one" read on; page 4, first column, line 27, claim 8, strike out "wing" and insert the same after "and", same line and claim; and that the said Letters Patent should be read with these corrections therein that the same may conform to the record of the case in the Patent Office.

Signed and sealed this 6th day of April, A. D. 1937.

Henry Van Arsdale
(Seal) Acting Commissioner of Patents.